United States Patent [19]

Purney, Sr. et al.

[11] 4,150,357
[45] Apr. 17, 1979

[54] MALFUNCTION ALERTING INDICATOR FOR CARBURETOR CHOKE VALVE

[76] Inventors: John E. Purney, Sr., c/o 207-7th St., SE., Canton, Ohio 44702; John E. Purney, Jr., 6215 Ronald, NW., North Canton, Ohio 44718; Ralph W. Purney, 3140 Landscape Cir., NW., Canton, Ohio 44709

[21] Appl. No.: 803,414

[22] Filed: Jun. 3, 1977

Related U.S. Application Data

[63] Continuation-in-part of Ser. No. 703,203, Jul. 7, 1976, abandoned.

[51] Int. Cl.² .................. B60Q 9/00; G08B 23/00
[52] U.S. Cl. .................. 340/52 R; 340/188 R; 340/686; 123/119 F; 340/201 P
[58] Field of Search .................. 340/52 R, 52 D, 53, 340/60, 366 D, 372, 378 R, 378 A, 282, 686; 307/10 R; 123/119 F; 261/39 R, 135

[56] References Cited

U.S. PATENT DOCUMENTS

| | | | |
|---|---|---|---|
| 2,738,404 | 3/1956 | Fitzsimmons | 340/60 X |
| 2,894,252 | 7/1959 | Lawhorn et al. | 340/282 |
| 3,291,461 | 12/1966 | Pope | 261/39 |
| 3,795,863 | 3/1974 | Uneda et al. | 324/122 |
| 3,938,074 | 2/1976 | Fox | 340/52 R |

Primary Examiner—John W. Caldwell, Sr.
Assistant Examiner—Joseph E. Nowicki
Attorney, Agent, or Firm—Clarence A. O'Brien; Harvey B. Jacobson

[57] ABSTRACT

The intermediate positions of a carburetor choke valve between fully open and closed positions are registered during engine operation by illumination of light emitting diodes on a dash mounted indicator to warn the driver of incomplete opening of the choke valve after initial cold engine start-up. Signal generating photocells supply the position signals to the indicator under control of a masking plate restrictively directing illumination from a source to one of the photocells. A linkage assembly connects the choke valve to the masking plate for movement thereof to positions corresponding to choke valve positions.

8 Claims, 5 Drawing Figures

TO IGNITION CIRCUIT

MALFUNCTION ALERTING INDICATOR FOR CARBURETOR CHOKE VALVE

BACKGROUND OF THE INVENTION

1. Field of the Invention

This invention relates to monitoring operation of a carburetor choke valve, the application being a continuation-in-part of our prior copending application U.S. Ser. No. 703,203, filed July 7, 1976, now abandoned.

2. Description of the Prior Art

In addition to the prior U.S. patents made of record in our prior copending application aforementioned, showing remote position indicators in general and for valves in particular, applicants are presently also aware of U.S. Pat. Nos. 2,021,832, 2,894,252 and 3,291,461. Of all of the foregoing patents, only U.S. Pat. No. 3,291,461 to Pope shows a position indicator for a choke valve. The position indicator shown is, however, operative to register only the fully open and closed positions of the choke valve prior to starting of the vehicle engine and is incidental to the main objective of opening the choke valve by over-riding its thermostat control through use of an electrical heating element.

It is, therefore, an important object of the present invention to provide a position indicator for the choke valve of a carburetor which will be operative only during engine operation to warn the driver of incomplete opening of the choke valve after cold engine start-up, by registering the positions of the choke valve intermediate the fully open and closed positions.

SUMMARY OF THE INVENTION

In accordance with the present invention, a signal generator is rendered operative upon closing of the vehicle ignition switch to generate position signals as a choke valve is automatically displaced from a closed position to a fully open position by a thermostat control under cold engine start-up conditions. The position signals operate solid-state, light emitting devices of an indicator component to register the intermediate position of the choke valve by red warning lights. Should these warning lights remain on after the engine has been warmed up, the driver will be alerted to malfunction of the choke valve mechanism so that remedial measures may be taken to avoid continued inefficient and wasteful combustion of a fuel mixture in the engine that is too rich. The present invention may be applicable in general to monitoring automatic or semi-automatic operation of movable elements of a carburetor system through which fuel mixture ratios are varied to affect fuel economy. For example, the secondary plates of a four barrel caburetor may be monitored. The present invention is, therefore, particularly useful in avoiding excessive fuel consumption and unnecessary air pollution resulting from combustion of an excessively rich fuel mixture.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENT

Figure 1:
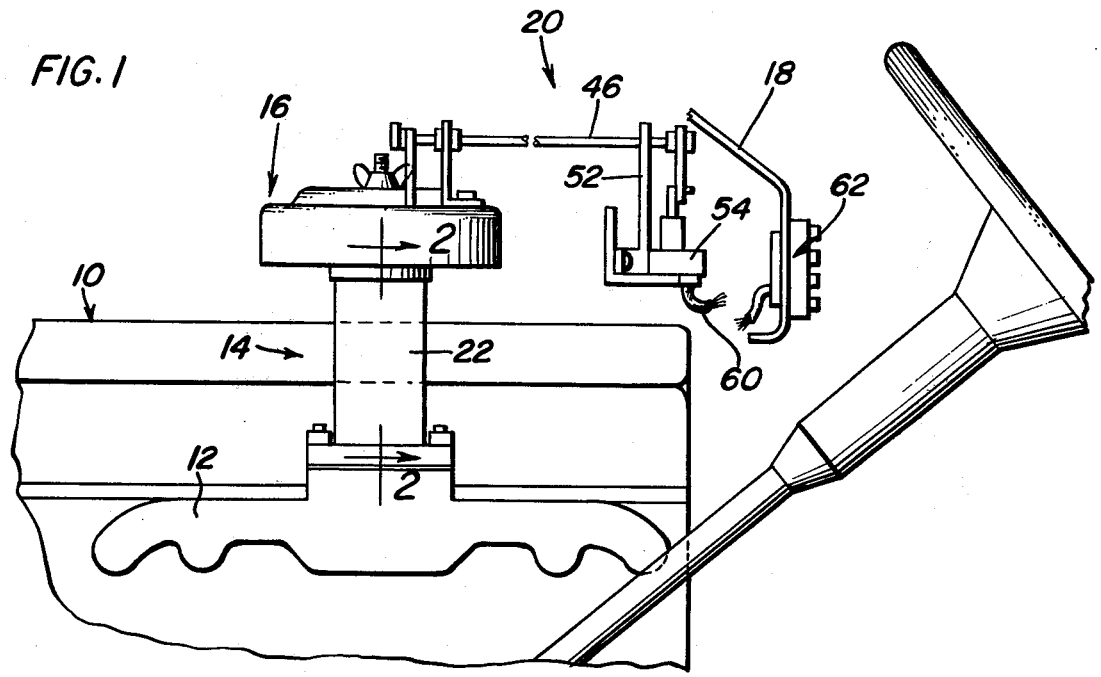
FIG. 1 is a partial side elevation view of a typical vehicle installation for the present invention.

Referring now to the drawings in detail, FIG. 1 shows a typical installation for the present invention within an automotive vehicle having an engine 10 with which an intake manifold 12 is associated, connected to any conventional carburetor 14. As is well known, an air-fuel mixture is admitted to the intake manifold through the carburetor at a variable air-fuel ratio. Air is drawn into the carburetor through an air cleaner 16. The instrument dash panel 18 located at the forward end of the passenger compartment in the vehicle within view of the driver, provides support for a portion of a malfunction alerting assembly generally denoted by reference numeral 20 in FIG. 1. The assembly 20 extends between the carburetor 14 and the dash panel 18 and may either be included as original equipment or readily installed after purchase in kit form.

Figure 2:
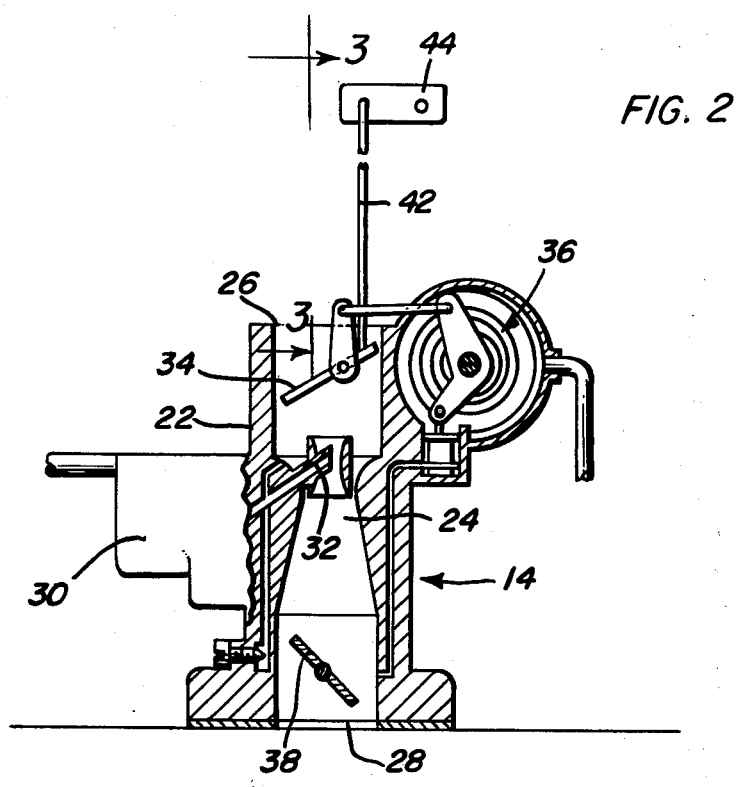
FIG. 2 is an enlarged partial section view taken substantially through a plane indicated by section line 2—2 in FIG. 1.

As shown in FIG. 2, the typical carburetor 14 includes a vertical housing within which a venturi passage 24 is formed between the upper air intake end 26 and the lower air-fuel mixture discharge end 28. The vacuum created by movement of the pistons in the engine cylinder draws in fuel from the fuel supply 30 entering the passage 24 at its throat through jet nozzle 32, while air from the air cleaner enters the intake end 26. A choke valve 34 is automatically displaced between a fully open position and a fully closed position adjacent the upper intake end 26 by means of a temperature sensing device or thermostat 36 so as to produce a rich air-fuel mixture under cold starting conditions by holding the choke valve closed to reduce the inflow rate of air. The throttle valve 38 controls the outflow rate of air-fuel mixture adjacent the discharge end 28 and is accordingly connected to the accelerator pedal (not shown) as is well known in the art.

Figure 3:
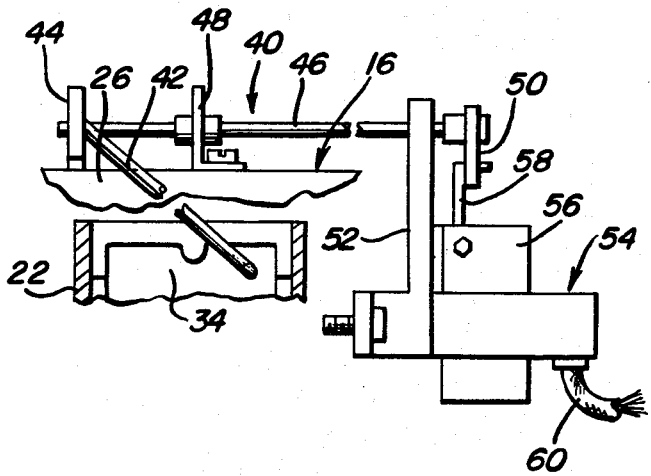
FIG. 3 is a partial section view taken substantially through a plane indicated by section line 3—3 in FIG. 2.
Figure 4:
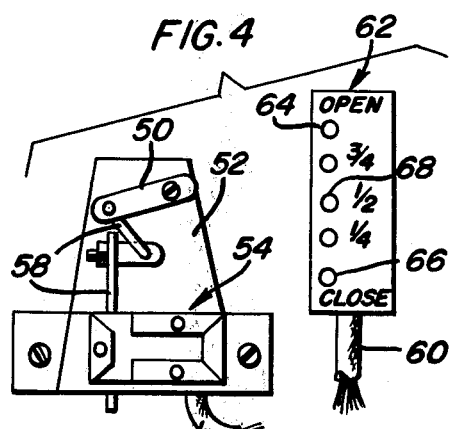
FIG. 4 is a front elevation view showing certain portions of the malfunction alerting assembly forming the present invention.

In accordance with the present invention, the operation of the choke valve 34 is monitored by the assembly 20 which includes a linkage train 40 connected to the choke valve as more clearly seen in FIGS. 2, 3 and 4. The linkage train includes a link 42 connected to the choke valve and extending upwardly therefrom through the intake end of the carburetor. A crank 44 interconnects the upper end of the link 42 to an elongated drive shaft 46 rotatably supported by a journal bracket 48 mounted on top of the air cleaner. The end of the drive shaft opposite its connection to crank 44 is connected to a crank 50 on one side of a mounting bracket 52 supporting therebelow a position signal generator 54. The signal generator includes a slidable masking plate 56 to which the crank 50 is connected by a link 58. The position signal generator is electrically connected by a cable 60 to an indicator component 62 mounted on the dash panel 18 as shown in FIG. 1.

Movement of the choke valve is transmitted through the linkage train 40 to the masking plate 56 of the signal generator to produce position indicating signals as will be explained hereinafter. These signals are transmitted by conductors in the cable 60 to the indicator component 62. The indicator component, as more clearly seen in FIG. 4, includes closely spaced light transmitting lenses arranged in a vertical column on the indicator panel. The upper and lower lenses 64 and 66 are colored green, for example, so as to signify a fully open or a closed choke valve, respectively, when illuminated. Illumination of the intermediate lenses 68, on the other hand, registers intermediate positions of the choke valve, such as ¾, ½ and ¼ open positions. The lenses 68 are colored red so as to transmit light at a corresponding wave length to warn the driver that the choke valve remains partially closed because of some malfunction during engine operation.

Figure 5:
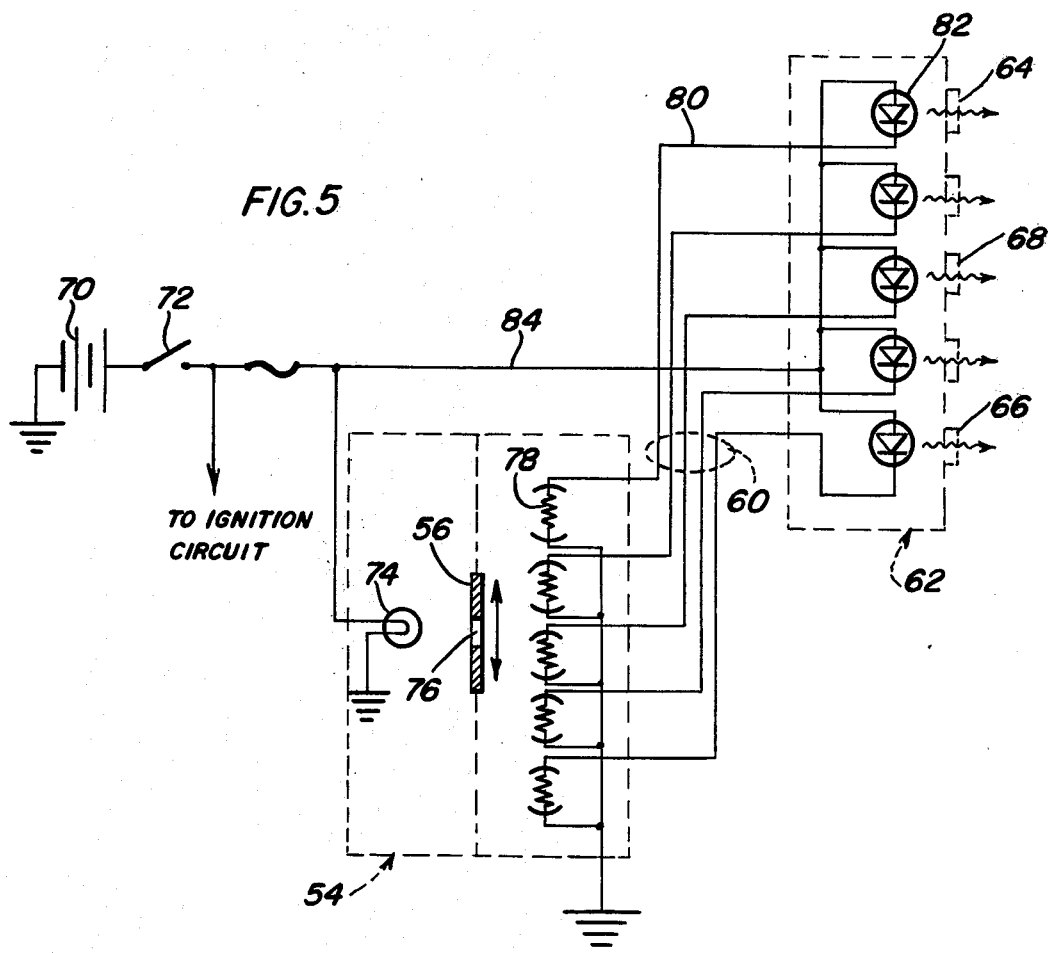
FIG. 5 is an electrical circuit diagram corresponding to the apparatus of the present invention.

Referring now to FIG. 5, a source of electrical energy such as the vehicle battery 70 connected to the engine ignition system upon closing of the ignition switch 72, operates the signal generator 54 and the indicator 62. Closing of the ignition switch will energize a source of illumination, such as lamp 74, in the signal generator. The light from lamp 74 is restrictively directed through an aperture 76 in the masking plate 56 to a selected one of a plurality of light sensing devices, such as cadmium sulfide photocells 78. Illumination impinging on a cell 78 will render the cell conductive to generate a signal current that is conducted through an associated signal conductor 80 in the cable 60 to a corresponding one of a plurality of light emitting diodes 82 or other such light emitting devices within the indicator component 62. Thus, the position of the masking plate 56 corresponding to that of the choke valve will cause one of the light emitting diodes 82 to conduct energizing current from the power supply line 84 to which all of the diodes are connected in parallel with lamp 74. The light emitted from a diode 82 will, therefore, register the position of the choke valve within clear view of the driver as hereinbefore indicated.

It will be apparent from the foregoing description that the malfunction alerting assembly 20 may be readily installed in an existing automotive vehicle with little modification so that the driver may easily monitor operation of the choke valve 34 from the dash mounted indicator 62 as in the case of other engine related equipment such as the oil lubricating system and the battery voltage supply during engine operation. Operating energy for the alerting assembly 20 is, therefore, supplied only during engine operation by closing of the ignition switch 72. The driver will thereby be warned by red light through one of the lenses 68 of any incomplete opening of the choke valve 34 after initial cold engine start-up so that appropriate carburetor adjustment or repair may be made to avoid inefficient and wasteful combustion of an excessively rich fuel mixture in the engine.

In a similar fashion, the secondary plates of a four barrel carburetor system could be monitored for the same purpose.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle having an ignition controlled engine, an ignition switch through which operation of the engine is initiated, a carburetor and a choke valve restricting inflow of air to the carburetor under cold engine start-up conditions, said choke valve being displaceable from a fully open position to a closed position during engine shutdown; malfunction alerting means for monitoring operation of the choke valve during engine operation, comprising electrical signal generating means connected to the choke valve for producing position signals, indicating means connected to the signal generating means for registering positions of the choke valve intermediate said fully open and closed positions in response to said position signals, and means connecting the ignition switch to the signal generating means for preventing operation thereof during engine shutdown.

2. The combination of claim 1 wherein said indicator means includes a plurality of light emitting components respectively illuminated to signify said positions of the choke valve, and means for transmitting the illumination from said components at a predetermined wave length corresponding to the intermediate positions to signify malfunction of the choke valve in failing to move to the fully open position.

3. The combination of claim wherein said illumination transmitting means comprises colored lenses.

4. The combination of claim 1 wherein said signal generating means includes a source of illumination, and masking means operatively connected to said choke valve for restricting illumination from the source to the indicating means.

5. The combination of claim 1 wherein said signal generating means includes a plurality of light sensing cells mounted in close spaced relation to each other, a source of electrical energy connected to said cells for operation thereof upon closing of the ignition switch, signal lamp means connected to said source for illuminating of the cells to render the cells conductive, and light masking means operatively connected to the choke valve for restricting said illumination to one of the cells corresponding to the position of the choke valve.

6. In combination with a vehicle having an ignition controlled engine, an ignition switch through which operation of the engine is initiated, a careburetor having a fuel mixture controlling element automatically displaceable from a fully open position to a closed position; malfunction alerting means for monitoring operation of the element during engine operation, comprising electrical signal generating means connected to the element for producing position signals, indicating means connected to the signal generating means for registering positions of the element intermediate said fully open and closed positions in response to said position signals, and means connecting the ignition switch to the signal generating means for rendering the same operative only during engine operation, said fuel mixture controlling element being a choke valve restricting inflow of air to the carburetor under cold engine start-up condition, said signal generating including a plurality of light sensing cells mounted in close spaced relation to each other, a source of electrical energy connected to said cells for operation thereof upon closing of the ignition switch, signal lamp means connected to said source for illumination of the cells to render the cells conductive, and light masking means operatively connected to the choke valve for restricting said illumination to one of the cells corresponding to the position of the choke valve.

7. The combination of claim 6 wherein said indicator means includes a plurality of light emitting diodes, each diode connected to the source and to a corresponding one of the light sensing cells.

8. In combination with a carburetor having a throttle valve and a choke valve, malfunction alerting means for monitoring operation of the choke valve, comprising a plurality of light sensing devices mounted in spaced relation to each other for respectively generating position indicating signals when detecting illumination, a source of illumination, masking means for restrictively directing illumination from said source to a selected one of the light sensing devices, linkage means connecting the choke valve to the masking means for displacement thereof to change the selection of the light sensing devices illuminated, a plurality of indicator devices respectively connected to said light sensing devices for registering different positions of the choke valve in response to said position indicating signals, and means for producing a warning signal in response to registration of positions by the indicator devices other than the fully open and closed positions of the choke valve.

* * * * *

UNITED STATES PATENT AND TRADEMARK OFFICE
CERTIFICATE OF CORRECTION

PATENT NO. : 4,150,357
DATED : April 17, 1979
INVENTOR(S) : John E. Purney, Sr. et al It is certified that error appears in the above—identified patent and that said Letters Patent are hereby corrected as shown below:

Column 4, line 26, after "claim" insert --2--.

Signed and Sealed this

Seventeenth Day of July 1979

[SEAL]

Attest:

Attesting Officer

LUTRELLE F. PARKER
Acting Commissioner of Patents and Trademarks